US011193592B1

(12) United States Patent
Li et al.

(10) Patent No.: US 11,193,592 B1
(45) Date of Patent: Dec. 7, 2021

(54) MAGNETIC FLUID SEALING DEVICE

(71) Applicant: Tsinghua University, Beijing (CN)

(72) Inventors: Decai Li, Beijing (CN); Xiao Liu, Beijing (CN); Zepeng Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/405,647

(22) Filed: Aug. 18, 2021

(30) Foreign Application Priority Data

Oct. 21, 2020 (CN) .......................... 202011133474.5

(51) Int. Cl.
*F16J 15/43* (2006.01)
*F16C 33/76* (2006.01)
*F16C 33/78* (2006.01)
*F16C 33/82* (2006.01)

(52) U.S. Cl.
CPC ............. *F16J 15/43* (2013.01); *F16C 33/765* (2013.01); *F16C 33/782* (2013.01); *F16C 33/82* (2013.01)

(58) Field of Classification Search
CPC ..... F16J 15/43; F16C 33/6644; F16C 33/763; F16C 33/765; F16C 33/782
See application file for complete search history.

(56) References Cited

U.S. PATENT DOCUMENTS

| 4,340,233 | A | * | 7/1982 | Yamamura | ............... | F16J 15/43 |
| | | | | | | 277/302 |
| 4,357,021 | A | * | 11/1982 | Raj | .......................... | F16J 15/43 |
| | | | | | | 277/302 |
| 4,478,424 | A | * | 10/1984 | Raj | .......................... | F16J 15/43 |
| | | | | | | 277/302 |
| 8,920,035 | B2 | * | 12/2014 | Honda | ................... | F16C 35/061 |
| | | | | | | 384/446 |
| 9,816,616 | B2 | * | 11/2017 | Sumikawa | ............ | F16C 33/763 |
| 10,962,119 | B2 | * | 3/2021 | Yang | ........................ | F16J 15/18 |

(Continued)

FOREIGN PATENT DOCUMENTS

| CN | 101776149 | 7/2010 |
| CN | 104405886 | 3/2015 |

(Continued)

OTHER PUBLICATIONS

CNIPA, First Office Action for CN Application No. 202011133474.5, dated Mar. 10, 2021.

(Continued)

*Primary Examiner* — Nicholas L Foster
(74) *Attorney, Agent, or Firm* — Hodgson Russ LLP

(57) ABSTRACT

A magnetic fluid sealing device includes: a housing; a shaft rotatably penetrating through the housing; a first shaft sleeve made of a magnetic conductive material, and fitted over the shaft; a plurality of pole shoes arranged in the housing and fitted over the shaft and the first shaft sleeve, an inner circumferential surface of the pole shoe being provided with a plurality of pole teeth arranged at intervals in an axial direction of the shaft, the shaft and a first part of the plurality of pole teeth being arranged at intervals in a radial direction of the shaft to form a first gap, the first shaft sleeve and a second part of the plurality of pole teeth being arranged at intervals in the radial direction of the shaft to form a second gap; and a permanent magnet arranged in the housing and fitted over the shaft.

10 Claims, 2 Drawing Sheets

(56) References Cited

U.S. PATENT DOCUMENTS

| | | | | |
|---|---|---|---|---|
| 2004/0173972 A1* | 9/2004 | Li | ............................ | F16J 15/43 |
| | | | | 277/500 |
| 2010/0230901 A1* | 9/2010 | Brooks | .................... | F16J 15/43 |
| | | | | 277/317 |
| 2014/0044386 A1* | 2/2014 | Honda | ................. | F16C 33/6633 |
| | | | | 384/446 |
| 2015/0115541 A1* | 4/2015 | Sumikawa | ............... | F16J 15/43 |
| | | | | 277/410 |
| 2020/0309270 A1* | 10/2020 | Yang | ........................ | F16J 15/43 |

FOREIGN PATENT DOCUMENTS

| | | |
|---|---|---|
| CN | 108351031 | 7/2018 |
| EP | 1213518 | 6/2002 |
| EP | 1127234 | 9/2003 |
| JP | H1194095 | 4/1999 |

OTHER PUBLICATIONS

CNIPA, Notification to Grant Patent Right for Invention for CN Application No. 202011133474.5, dated Apr. 2, 2021.

\* cited by examiner

US 11,193,592 B1

MAGNETIC FLUID SEALING DEVICE

CROSS-REFERENCE TO RELATED APPLICATION

This application claims the benefit of priority to Chinese patent Application No. 202011133474.5, filed on Oct. 21, 2020, the content of which is incorporated herein by reference in its entirety.

FIELD

The present invention relates to the field of mechanical engineering sealing technologies, and particularly to a magnetic fluid sealing device.

BACKGROUND

A magnetic fluid seal is widely applied to the aerospace field due to advantages of zero leakage, a long service life, a high reliability, or the like.

In a related art, in a starting operation in a low temperature environment, a starting torque of a sealing device is large due to a high viscosity of magnetic fluid at a low temperature, thus causing large energy loss. Moreover, after the magnetic fluid sealing device works for a period of time, a temperature of the magnetic fluid is prone to increase due to high-speed rotation of a shaft, and a base fluid of the magnetic fluid is prone to volatilization, resulting in a failure of the magnetic fluid seal.

SUMMARY

The present invention seeks to solve at least one of the problems in the related art to some extent.

A magnetic fluid sealing device according to an embodiment of the present invention includes: a housing; a shaft rotatably penetrating through the housing; a first shaft sleeve made of a magnetic conductive material, a volume of the first shaft sleeve being configured to increase with a rise of a temperature in the housing, and the first shaft sleeve being fitted over the shaft; a plurality of pole shoes provided in the housing and fitted over the shaft and the first shaft sleeve, an inner circumferential surface of the pole shoe being provided with a plurality of pole teeth arranged at intervals in an axial direction of the shaft, the shaft and a first part of the plurality of pole teeth being arranged at intervals in a radial direction of the shaft to form a first gap, the first shaft sleeve and a second part of the plurality of pole teeth being arranged at intervals in the radial direction of the shaft to form a second gap, a magnetic fluid having a base fluid with a small molecular weight being arranged in the first gap, a magnetic fluid having a base fluid with a large molecular weight being arranged in the second gap, the second gap being configured to be reduced with an increase of the volume of the first shaft sleeve, the second gap being greater than the first gap when the temperature in the housing is not higher than a preset value, and the plurality of pole shoes being arranged at intervals in the axial direction of the shaft; and a permanent magnet arranged in the housing and fitted over the shaft, the permanent magnet being arranged between two adjacent pole shoes.

DETAILED DESCRIPTION

Figure 1:
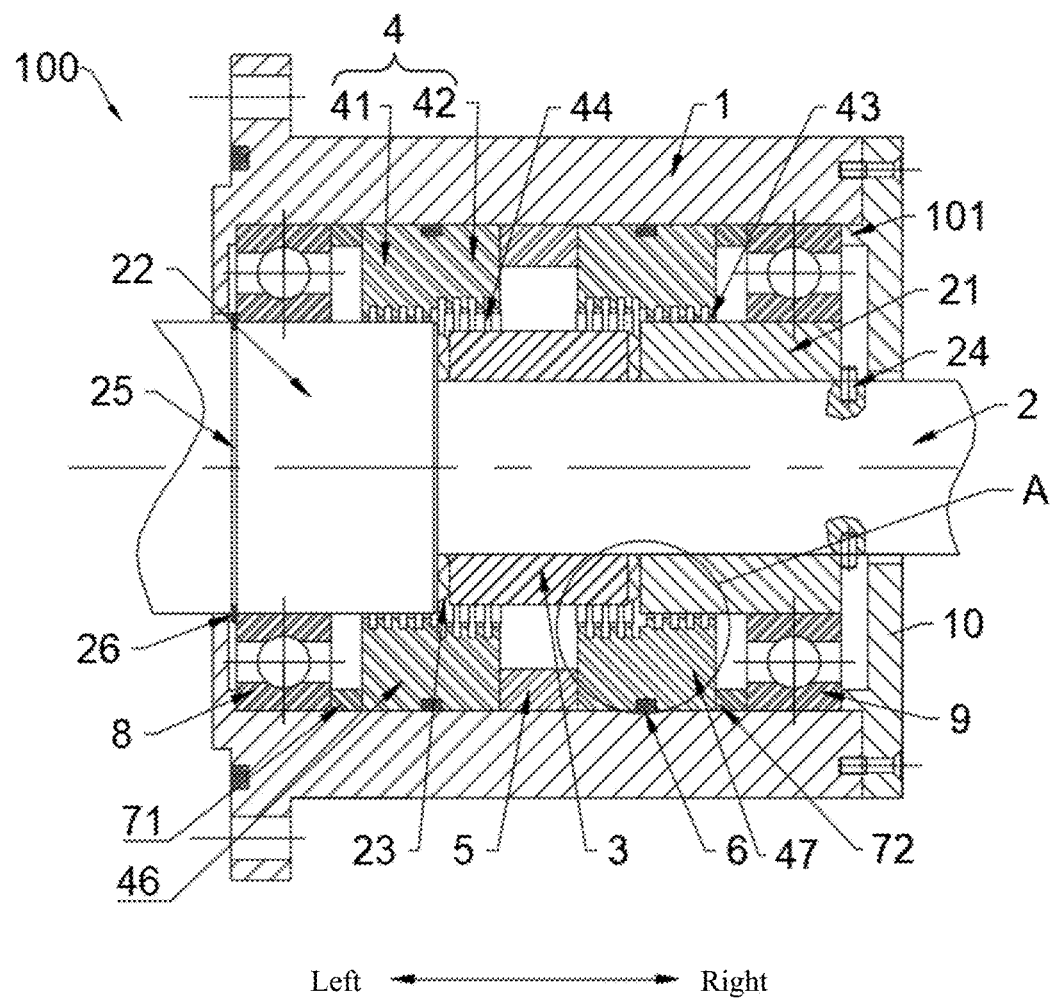
FIG. 1 is a schematic view of a magnetic fluid sealing device according to an embodiment of the present invention.
Figure 2:
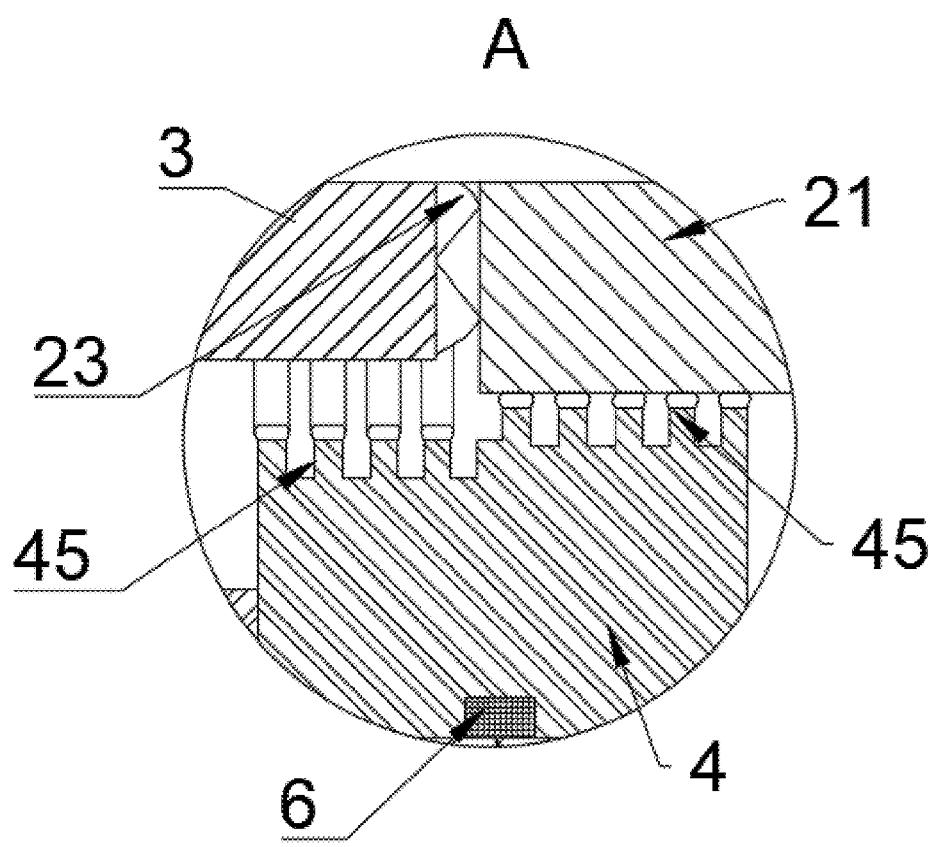
FIG. 2 is a partially enlarged view of a portion A in FIG. 1.

Reference will be made in detail to embodiments of the present invention, and the examples of the embodiments are illustrated in the drawings. The embodiments described herein with reference to drawings are illustrative, and intended for explaining the present invention. The embodiments shall not be construed to limit the present invention.

A magnetic fluid sealing device 100 according to an embodiment of the present invention will be described below with reference to accompanying drawings.

As shown in FIG. 1, a magnetic fluid sealing device 100 according to an embodiment of the present invention includes a housing 1, a shaft 2, a first shaft sleeve 3, a plurality of pole shoes 4, and a permanent magnet 5.

The shaft 2 rotatably penetrates through the housing 1. The housing 1 may be provided at a body of a reactor or a tank body of a stirring tank by a bolt to seal fluid in the reactor or the stirring tank, and the shaft 2 is connected with a stirring shaft of the reactor or the stirring tank by a coupling, such that the sealed fluid in the reactor or the stirring tank may react more fully.

The first shaft sleeve 3 is made of a magnetic conductive material, a volume of the first shaft sleeve 3 may change with a change of a temperature in the housing 1, and the first shaft sleeve 3 is fitted over the shaft 2. That is, the first shaft sleeve 3 is made of a magnetic conductive material with a large thermal expansion coefficient, and the volume of the first shaft sleeve 3 may be changed as follows: the volume of the first shaft sleeve 3 contracts with decrease of the temperature in the housing 1, and expands with increase of the temperature in the housing 1.

The pole shoe 4 is provided in the housing 1 and fitted over the shaft 2 and the first shaft sleeve 3, and an inner circumferential surface of the pole shoe 4 is provided with a plurality of pole teeth 45 arranged at intervals in an axial direction (the left-right direction shown in FIG. 1) of the shaft 2. The shaft 2 and a first part of the plurality of pole teeth 45 are provided at intervals in a radial direction of the shaft 2 to form a first gap 43, the first shaft sleeve 3 and a second part of the plurality of pole teeth 45 are provided at intervals in the radial direction of the shaft 2 to form a second gap 44, a magnetic fluid having a base fluid with a small molecular weight is arranged in the first gap 43, a magnetic fluid having a base fluid with a large molecular weight is arranged in the second gap 44, the second gap 44 may be changed with the change of the volume of the first shaft sleeve 3, the second gap 44 is greater than the first gap 43 when the temperature in the housing 1 is not higher than a preset value, and the plurality of pole shoes 4 are arranged at intervals in the axial direction of the shaft 2.

The permanent magnet 5 is provided in the housing 1, fitted over the shaft 2, and provided between two adjacent pole shoes 4. A closed magnetic circuit is formed by the permanent magnet 5, the pole shoe 4 and the shaft 2, and a non-uniform magnetic field with alternate strengths is generated in a gap between the shaft 2 and the pole tooth 45 of the pole shoe 4 utilizing magnetic energy in the permanent magnet 5, such that the magnetic fluid is sucked between the pole tooth 45 and the shaft 2 to form a magnetic fluid sealing ring to block the gap between the pole shoe and the shaft, thereby achieving a sealing purpose.

In the magnetic fluid sealing device 100 according to the embodiment of the present invention, the shaft 2 and the first part of the plurality of pole teeth 45 are provided at intervals in the radial direction of the shaft 2 to form the first gap 43, the first gap 43 is provided therein with the magnetic fluid having a base fluid with a small molecular weight, and the magnetic fluid having a base fluid with a small molecular weight has the advantages of a small molecular weight, a low viscosity under a low-temperature working condition, or the like. Therefore, the magnetic fluid sealing device 100 has a small starting torque, thus solving the problem of a large starting torque of the magnetic fluid sealing device 100 in a low-temperature state, and reducing energy consumption of the magnetic fluid sealing device 100.

In the magnetic fluid sealing device 100 according to the embodiment of the present invention, the first shaft sleeve 3 and the second part of the plurality of pole teeth 45 are provided at intervals in the radial direction of the shaft 2 to form the second gap 44, the second gap 44 is provided therein with the magnetic fluid having a base fluid with a large molecular weight, and the second gap 44 may be changed with the change of the volume of the first shaft sleeve 3. Thus, when the temperature in the housing 1 is low, the first shaft sleeve 3 has a contracting volume, thereby increasing a distance of the second gap 44; at this point, the magnetic fluid having a base fluid with a large molecular weight in the second gap 44 does not play a sealing role; when the temperature in the housing 1 is high, the first shaft sleeve 3 has an expanding volume, thereby reducing the distance of the second gap 44; at this point, the magnetic fluid having a base fluid with a large molecular weight in the second gap 44 starts to play the sealing role; the magnetic fluid having a base fluid with a large molecular weight has advantages of a large molecular weight, low evaporation under a high-temperature working condition, or the like, thus effectively solving the problem that the magnetic fluid is prone to volatilization at the high temperature, and then prolonging the service life of the magnetic fluid sealing device 100.

The magnetic fluid sealing device 100 according to the embodiment of the present invention has the following working process: when the magnetic fluid sealing device 100 just starts to work, the temperature in the housing 1 is low, the volume of the first shaft sleeve 3 is in a contracting state, and thus, the second gap 44 is large, the magnetic fluid having a base fluid with a large molecular weight in the second gap 44 does not work, the magnetic fluid having a base fluid with a small molecular weight in the first gap 43 starts to work, and due to the low viscosity of the magnetic fluid having a base fluid with a small molecular weight, the starting torque is small when the magnetic fluid sealing device 100 works. When the magnetic fluid sealing device 100 works for a period of time, the temperature in the housing 1 of the magnetic fluid sealing device 100 rises due to rotation of the shaft 2, and since the magnetic fluid having a base fluid with a small molecular weight is prone to volatilization at the high temperature, the magnetic fluid having a base fluid with a small molecular weight in the first gap 43 volatilizes due to the rise of the temperature in the housing 1, and the first shaft sleeve 3 has an expanding volume, thereby reducing the second gap 44; at this point, the magnetic fluid having a base fluid with a large molecular weight in the second gap 44 starts to work, thereby effectively solving the problems of the large starting torque at the low temperature and a seal failure caused by volatilization of the base fluid of the magnetic fluid at the high temperature, improving a sealing performance of the magnetic fluid sealing device 100, and prolonging the service life of the magnetic fluid sealing device 100.

Therefore, the magnetic fluid sealing device 100 according to the embodiment of the present invention may simultaneously solve the problems of the large starting torque at the low temperature and the seal failure caused by the volatilization of the base fluid of the magnetic fluid at the high temperature, and has a good sealing effect and a long service life.

It should be noted that the base fluid with a small molecular weight may be selected from lubricating oil with a small molecular weight, such as engine oil, kerosene, or the like, and the base fluid with a large molecular weight may be selected from lubricating oil with a large molecular weight, such as perfluoropolyether oil, or the like.

The first gap 43 and the second gap 44 have sizes which are not limited in the present invention, and the first gap 43 may be selected according to a sealing gap of a general magnetic fluid seal 100. Since the first shaft sleeves 3 made of different materials have different expansion coefficients, the second gap 44 may be adjusted according to the different materials of the first shaft sleeves 3, and it is only required to ensure that when the temperature in the housing 1 is low, the second gap 44 is large, such that the magnetic fluid having a base fluid with a large molecular weight does not play the sealing role, and when the temperature in the housing 1 is high, the second gap is small, such that the magnetic fluid having a base fluid with a large molecular weight plays the sealing role. The preset value for the temperature in the housing 1 may be, for example, 30° C.

In some embodiments, the pole shoe 4 includes a first section 41 and a second section 42 connected in sequence in the axial direction of the shaft 2, and an inner circumferential profile of the first section 41 has a cross-sectional area less than that of the second section 42. The above-mentioned first part of the plurality of pole teeth 45 are arranged to an inner circumferential surface of the first section 41, and the above-mentioned second part of the plurality of pole teeth 45 are arranged to an inner circumferential surface of the second section 42. In other words, the pole tooth 45 of the pole shoe 4 between which and the shaft 2 the first gap 43 is defined is arranged to the inner circumferential surface of the first section 41, the pole tooth 45 of the pole shoe 4 between which and the shaft 2 the second gap 44 is defined is arranged to the inner circumferential surface of the second section 42, and the inner circumferential profile of the first section 41 has a cross-sectional area less than that of the second section 42, thereby conveniently guaranteeing the sizes of the first gap 43 and the second gap 44, such that the pole shoe 4 has a more reasonable structure.

In some embodiments, in adjacent pole shoes 4, the second section 42 of one pole shoe 4 is closer to the other pole shoe 4 than the first section 41 thereof, and the second section 42 of the other pole shoe 4 is closer to the one pole shoe 4 than the first section 41 thereof. Specifically, as shown in FIG. 1, the plurality of pole shoes 4 include a left pole shoe 46 and a right pole shoe 47, the first section 41 of the left pole shoe 46 is provided at a left end portion of the left pole shoe 46, the second section 42 is provided at a right end portion of the left pole shoe 46, the first section 41 of the right pole shoe 47 is provided at a right end portion of the right pole shoe 47, and the second section 42 is provided at a left end portion of the right pole shoe 47, such that the left pole shoe 46 and the right pole shoe 47 are symmetrically arranged, thereby facilitating the plurality of pole teeth 45 of the second section 42 of the pole shoe 4 and the first shaft sleeve 3 to be provided at intervals in the radial direction of the shaft 2 to form the second gap 44, and further making a layout of the pole shoe 4 in the housing 1 more reasonable.

In some embodiments, the first section 41 and the second section 42 are integrally formed. In the magnetic fluid sealing device 100 according to the embodiment of the present invention, integral formation of the first section 41 and the second section 42 may prevent magnetic lines of force generated by the permanent magnet 5 from being leaked through a gap between the first section 41 and the second section 42, thereby increasing the sealing performance of the magnetic fluid sealing device 100. It may be understood that, in the present invention, the first section 41 and the second section 42 are not limited to being integrally formed, may also be configured as separate components, and are connected together by means of a connecting piece, welding, bonding, or the like.

In some embodiments, the shaft 2 is provided with a flange 22, and the first gap 43 between at least one pole of the plurality of pole shoes 4 and the shaft 2 is defined between the flange 22 and the first part of the plurality of pole teeth 45 of the at least one pole shoe 4. Specifically, as shown in FIG. 1, the flange 22 is provided on a left side of the first shaft sleeve 3, and the pole tooth 45 of the first section 41 of the left pole shoe 46 and the flange 22 are provided at intervals in the radial direction of the shaft 2 to form the first gap 43, such that the magnetic fluid sealing device 100 has a more reasonable arrangement.

In some embodiments, the magnetic fluid sealing device 100 further includes a second shaft sleeve 21 fitted over the shaft 2, the second shaft sleeve 21 and the flange 22 are arranged at intervals in the axial direction of the shaft 2, and the first gap 43 between at least another one pole shoe 4 of the plurality of pole shoes 4 and the shaft 2 is defined between the second shaft sleeve 21 and the first part of the plurality of pole teeth 45 of the at least another one pole shoe 4. Specifically, as shown in FIG. 1, the second shaft sleeve 21 is provided on a right side of the first shaft sleeve 3, and the pole tooth 45 of the first section 41 of the right pole shoe 47 and the second shaft sleeve 21 are provided at intervals in the radial direction of the shaft 2 to form the first gap 43, thus further making the arrangement of the magnetic fluid sealing device 100 more reasonable.

Optionally, an outer diameter of the flange 22 is equal to an outer radius of the second shaft sleeve 21, such that an inner diameter of the pole shoe 4 fitted over the flange 22 may be ensured to be equal to an inner diameter of the pole shoe 4 fitted over the second shaft sleeve 21, thereby guaranteeing the size of the first gap, and then lowering a difficulty in processing and manufacturing the pole shoe 4.

In some embodiments, the first shaft sleeve 3 is provided between the flange 22 and the second shaft sleeve 21. Specifically, as shown in FIG. 1, the flange 2 is provided on the left side of the first shaft sleeve 3, and the second shaft sleeve 21 is provided on the right side of the first shaft sleeve 3. Thus, the flange 22 and the second shaft sleeve 21 play a positioning role for the first shaft sleeve 3, such that the flange 22 and the second shaft sleeve 21 may prevent displacement of the first shaft sleeve 3 in the axial direction of the shaft 2 due to expansion caused by heat and contraction caused by cold.

In some embodiments, when the temperature in the housing 1 is not higher than the preset value, in a projection plane orthogonal to the axial direction of the shaft 2, a projection of the first shaft sleeve 3 is located in a projection of the flange 22, and the projection of the first shaft sleeve 21 is located in a projection of the second shaft sleeve 21. Specifically, as shown in FIG. 1, when the temperature in the housing 1 is not higher than the preset value, during projection from right to left, in the projection plane orthogonal to the axial direction of the shaft 2, the projection of the first shaft sleeve 3 is located in the projection of the flange 22, and the projection of the first shaft sleeve 21 is located in the projection of the second shaft sleeve 21. Thus, when the temperature is lower than the preset value, a radius of an outer circumferential surface of the first shaft sleeve 3 is less than a radius of an outer circumferential surface of the second shaft sleeve 21 and a radius of an outer circumferential surface of the flange 22, thereby effectively ensuring that the second gap 44 is greater than the first gap 43, such that the magnetic fluid having a base fluid with a large molecular weight in the second gap 44 does not play the sealing role at the low temperature.

In some embodiments, the magnetic fluid sealing device 100 further includes an elastic member 23 provided between the first shaft sleeve 3 and the flange 22 and between the first shaft sleeve 3 and the second shaft sleeve 21. Specifically, as shown in FIG. 1, the shaft penetrates through the elastic member 23, a left side surface of the first shaft sleeve 3 and a right side surface of the flange 22 are attached to two ends of one elastic member 23 respectively, and a right side surface of the second shaft sleeve 21 and a left side surface of the flange 22 are attached to two ends of the other elastic member 23 respectively. Thus, when the volume of the first shaft sleeve 3 changes with the temperature, the elastic member 23 may further prevent displacement of the first shaft sleeve 3 in the axial direction of the shaft 2.

Optionally, the elastic member 23 may be configured as a wave spring shim which has advantages of a small wave elastic force, a uniform stress, no damage to a surface of a connected part, or the like. Therefore, selection of the wave spring shim may effectively prevent the first shaft sleeve 3 from being displaced in the axial direction of the shaft 2, and ensures that two end surfaces of the first shaft sleeve 3 are not damaged by the elastic member 23, thus prolonging a service life of the first shaft sleeve 3.

In some embodiments, the magnetic fluid sealing device 100 includes a first magnetic isolation ring 71 and a second magnetic isolation ring 72 which are provided in the housing 1 and fitted over the shaft 2, the first magnetic isolation ring 71 and the second magnetic isolation ring 72 are provided at intervals in the axial direction of the shaft 2, and the plurality of pole shoes 4 are located between the first magnetic isolation ring 71 and the second magnetic isolation ring 72. Specifically, as shown in FIG. 1, the first magnetic isolation ring 71 and the second magnetic isolation ring 72 are provided in the housing 1 and fitted over the shaft 2, an outer circumferential surface of the first magnetic isolation ring 71 is attached to an inner circumferential surface of the housing 1, an outer circumferential surface of the second magnetic isolation ring 72 is attached to the inner circumferential surface of the housing 1, the first magnetic isolation ring 71 is provided on a left side of the plurality of pole shoes 4, and the second magnetic isolation ring 72 is provided on a right side of the plurality of pole shoes 4. Therefore, the first magnetic isolation ring 71 and the second magnetic isolation ring 72 may prevent the magnetic lines of force generated by the permanent magnet 5 from being leaked from two ends of the plurality of pole shoes 4, thereby enhancing the sealing performance of the magnetic fluid sealing device 100.

In some embodiments, as shown in FIG. 1, the magnetic fluid sealing device 100 includes a first bearing 8 and a second bearing 9 which are provided in the housing 1 and mounted to the shaft 2, and the first magnetic isolation ring 71 and the second magnetic isolation ring 72 are located between the first bearing 8 and the second bearing 9. Specifically, as shown in FIG. 1, the first bearing 8 is provided on a left side of the first magnetic isolation ring 71 and disposed at the flange 22, the second bearing 9 is provided on a right side of the second magnetic isolation ring 72 and disposed at the second shaft sleeve 21, an inner ring of the first bearing 8 is in interference fit with the flange 22, an inner ring of the second bearing 9 is in interference fit with the second shaft sleeve 21, and outer rings of the first bearing 8 and the second bearing 9 are in clearance fit with the inner circumferential surface of the housing 1, such that not only the shaft 2 may be guaranteed to smoothly rotate in the housing 1, but also the first bearing 8 and the second bearing 9 may be conveniently taken out of the housing 1 along with the shaft 2 when the magnetic fluid having a base fluid with a small molecular weight is required to be added in the first gap 43, the magnetic fluid having a base fluid with a large molecular weight is required to be added in the second gap 44, or parts in the housing 1 are required to be repaired.

Optionally, rolling bearings are selected as the first bearing 8 and the second bearing 9.

In some embodiments, as shown in FIG. 1, the magnetic fluid sealing device 100 further includes a sealing ring 6, an annular groove is defined at an outer circumferential surface of the pole shoe 4, the sealing ring 6 is fitted in the annular groove, and an outer circumferential surface of the sealing ring 6 is attached to the inner circumferential surface of the housing 1. In the magnetic fluid sealing device 100 according to the embodiment of the present invention, the sealing ring 6 is provided on the outer circumferential surface of the pole shoe 4, such that a sealed base fluid may be prevented from being leaked to an external environment from a gap between the inner circumferential surface of the housing 1 and the outer circumferential surface of the pole shoe 4, thereby guaranteeing the sealing performance of the magnetic fluid sealing device 100.

In some embodiments, as shown in FIG. 1, a groove 25 in the radial direction of the shaft 2 is defined at an outer circumferential surface of a first end portion (for example, the left end portion of the flange 22 in FIG. 1) of the flange 22, a circlip 26 is mounted in the groove 25, and a part of the circlip 26 extends out of the groove 25 to be fitted with the first bearing 8. Specifically, as shown in FIG. 1, the groove 25 in the radial direction of the shaft 2 is defined at an outer circumferential surface of the flange 22 and provided on a left side of the first bearing 8, the circlip 26 is provided in the groove 25, a part of the circlip 26 extends out of the groove 25 to be attached to the inner ring of the first bearing 8, and when the magnetic fluid having a base fluid with a small molecular weight is required to be added in the first gap 43, the magnetic fluid having a base fluid with a large molecular weight is required to be added in the second gap 44, the first bearing 8 is damaged or the second bearing 9 is damaged, parts on the shaft 2 are pushed by the circlip 26 to be taken out of the housing 1, thereby facilitating addition of the magnetic fluid or replacement of the bearing.

In some embodiments, as shown in FIG. 1, an end cover 10 is detachably mounted at a second end surface (for example, the right end surface of the housing 1 in FIG. 1) of the housing 1, a locating sleeve 101 extending in the axial direction of the shaft 2 is provided at a first end surface (for example, the left end surface of the end cover 10 in FIG. 1) of the end cover 10, the locating sleeve 101 may position the outer ring of the second bearing 9, and a sealed environment is formed in the housing 1 by the end cover 10, thereby preventing the external environment from polluting the magnetic fluid sealing device 100.

In some embodiments, as shown in FIG. 1, a plurality of locating pieces 24 are provided between the second shaft sleeve 21 and the end cover 10, and arranged at intervals in a circumferential direction of the shaft 2, so as to position the second shaft sleeve 21. Since the first shaft sleeve 3 presses the elastic member 23 when expanding with the rise of the temperature, the elastic member 23 may press the second shaft sleeve 21, and the locating piece 24 may prevent axial displacement of the second shaft sleeve 21 on the shaft 2 due to the expansion of the first shaft sleeve 3.

Optionally, the locating piece 24 is configured as a screw which is mounted to the shaft 2, and a part of the screw is fitted with the second shaft sleeve 21, thereby making the arrangement of the locating piece 24 more reasonable.

A magnetic fluid sealing device 100 according to some specific examples of the present invention is described below with reference to FIG. 1.

The magnetic fluid sealing device 100 according to the specific example of the present invention includes: a housing 1, a shaft 2, a first shaft sleeve 3, two pole shoes 4, a permanent magnet 5, a first magnetic isolation ring 71, a second magnetic isolation ring 72, a first bearing 8, a second bearing 9 and an end cover 10.

The shaft 2 rotatably penetrates through the housing 1, a flange 22 is provided at a right end of the shaft 2, the second shaft sleeve 21 is mounted at a left end portion of the shaft 2, the first shaft sleeve 3 is provided between the flange 22 and the second shaft sleeve 21, wave spring shims are provided between the first shaft sleeve 3 and the flange 22 and between the first shaft sleeve 3 and the second shaft sleeve 21, the shaft penetrates through the wave spring shim, a left side surface of the first shaft sleeve 3 and a right side surface of the flange 22 are attached to two ends of one wave spring shim respectively, a right side surface of the second shaft sleeve 21 and a left side surface of the flange 22 are attached to two ends of the other wave spring shim respectively, and the wave spring shim may position the first shaft sleeve 3.

The first shaft sleeve 3 is made of a magnetic conductive material, the volume of the first shaft sleeve 3 may expand with a rise of a temperature in the housing 1, the two pole shoes 4 are provided in the housing 1 and fitted over the shaft 2 and the first shaft sleeve 3, an inner circumferential surface of the pole shoe 4 is provided with a plurality of pole teeth 45 arranged at intervals in an axial direction of the shaft 2, each pole shoe 4 includes a first section 41 and a second section 42, the two pole shoes 4 include a left pole shoe 46 and a right pole shoe 47, the first section 41 of the left pole shoe 46 is provided at a left end portion of the left pole shoe 46, the second section 42 is provided at a right end portion of the left pole shoe 46, the first section 41 of the right pole shoe 47 is provided at a right end portion of the right pole shoe 47, the second section 42 is provided at a left end portion of the right pole shoe 47, the first section 41 of the left pole shoe 46 and the flange 22 are provided at intervals in a radial direction of the shaft 2 to form the first gap 43, the first section 41 of the right pole shoe 47 and the second shaft sleeve 21 are provided at intervals in the radial direction of the shaft 2 to form the first gap 43, the second section 42 of the left pole shoe 46 and the second section 42 of the right pole shoe 47 are spaced apart from the first shaft sleeve 3 in the radial direction of the shaft 2 to form the second gap 44, the first gap 43 is provided therein with magnetic fluid having a base fluid with a small molecular weight, the second gap 44 is provided therein with magnetic fluid having a base fluid with a large molecular weight, an annular groove is defined at an outer circumferential surface of each pole shoe 4, a sealing ring 6 is fitted in the annular groove, and an outer circumferential surface of the sealing ring 6 is attached to an inner circumferential surface of the housing 1. The second gap 44 may be changed with a change of the volume of the first shaft sleeve 3, when the temperature in the housing 1 is not higher than a preset value, the second gap 44 is greater than the first gap 43, when the temperature is low, the magnetic fluid having a base fluid with a small molecular weight in the first gap 43 plays a sealing role, and since the second gap 44 is large, the magnetic fluid having a base fluid with a large molecular weight in the second gap 44 does not play the sealing role; when the sealing device works for a period of time, the temperature in the housing 1 rises, the magnetic fluid having a base fluid with a small molecular weight volatilizes, and the volume of the first shaft sleeve 3 expands, such that the second gap 44 is reduced, and the magnetic fluid having a base fluid with a large molecular weight in the second gap 44 starts to play the sealing role, thus simultaneously solving problems of a large starting torque at the low temperature and a seal failure caused by volatilization of the base fluid of the magnetic fluid at the high temperature.

The permanent magnet 5 is provided in the housing 1, fitted over the shaft 2 and provided between the left pole shoe 46 and the right pole shoe 47. The first magnetic isolation ring 71 and the second magnetic isolation ring 72 are provided in the housing 1, fitted over the shaft 2 and arranged at intervals in the axial direction of the shaft 2, an outer circumferential surface of the first magnetic isolation ring 71 is attached to the inner circumferential surface of the housing 1, an outer circumferential surface of the second magnetic isolation ring 72 is attached to the inner circumferential surface of the housing 1, the first magnetic isolation ring 71 is provided on a left side of the left pole shoe 4, and the second magnetic isolation ring 72 is provided on a right side of the right pole shoe 4. The first bearing 8 is provided on a left side of the first magnetic isolation ring 71 and disposed at the flange 22, the second bearing 9 is provided on a right side of the second magnetic isolation ring 72 and disposed at the second shaft sleeve 21, an inner ring of the first bearing 8 is in interference fit with the flange 22, an inner ring of the second bearing 9 is in interference fit with the second shaft sleeve 21, and outer rings of the first bearing 8 and the second bearing 9 are in clearance fit with the inner circumferential surface of the housing 1.

The end cover 10 is detachably mounted at a right end surface of the housing 1, a locating sleeve 101 extending in the axial direction of the shaft 2 is provided at a left end surface of the end cover 10, the locating sleeve 101 may position the outer ring of the second bearing 9, and a sealed environment is formed in the housing 1 by the end cover 10, thereby preventing the external environment from polluting the magnetic fluid sealing device 100. A groove 25 in the radial direction of the shaft 2 is defined at an outer circumferential surface of a left end portion of the flange 22, a circlip 26 is mounted in the groove 25, and a part of the circlip 26 extends out of the groove 25 to be fitted with the first bearing 8. When the magnetic fluid having a base fluid with a small molecular weight is required to be added in the first gap 43, the magnetic fluid having a base fluid with a large molecular weight is required to be added in the second gap 44, the first bearing 8 is damaged or the second bearing 9 is damaged, parts on the shaft 2 are pushed by the circlip 26 to be taken out of the housing 1, thereby facilitating addition of the magnetic fluid or replacement of the bearing.

A plurality of screws 24 are provided between the second shaft sleeve 21 and the end cover 10, arranged at intervals in a circumferential direction of the shaft 2, and attached to the right side surface of the second shaft sleeve 21, so as to position the second shaft sleeve 21. Since the first shaft sleeve 3 presses an elastic member 23 when expanding with the rise of the temperature, the elastic member 23 may press the second shaft sleeve 21, and the screw may prevent axial displacement of the second shaft sleeve 21 on the shaft 2 due to the expansion of the first shaft sleeve 3.

In descriptions of the present invention, it should be understood that, directions or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential" etc. are based on orientations or positional relationships shown in the accompanying drawings, and they are used only for describing the present invention and for description simplicity, but do not indicate or imply that an indicated device or element must have a specific orientation or be constructed and operated in a specific orientation. Therefore, it cannot be understood as a limitation on the present invention.

In addition, the terms such as "first" and "second" are used herein for purposes of description and are not intended to indicate or imply relative importance or significance or to imply the number of indicated technical features. Thus, the feature defined with "first" and "second" may include at least one of this feature explicitly or implicitly. In the description of the present invention, "a plurality of" means at least two, for example, two, three, or the like, unless specifically limited otherwise.

In the present invention, unless specified or limited otherwise, the terms "mounted", "connected", "coupled", and "fixed" and the like are used broadly, and may be, for example, fixed connections, detachable connections, or integral connections; may also be mechanical or electrical connections or communication with each other; may also be direct connections or indirect connections via intervening structures; may also be communication or an interaction relationship of two elements. The above terms can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are contacted via an additional feature formed therebetween.

Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present invention, terms "an embodiment", "some embodiments", "example", "specific example" or "some examples" means that a particular feature, structure, material, or characteristic described in connection with the embodiment or example is included in at least one embodiment or example of the present invention. In the specification, the schematic expressions to the above-mentioned terms are not necessarily referring to the same embodiment or example. Furthermore, the described particular features, structures, materials, or characteristics may be combined in any suitable manner in one or more embodiments or examples. Furthermore, those skilled in the art may combine different embodiments or examples and features in different embodiments or examples described in the specification, without mutual contradictions.

Although embodiments of the present invention have been shown and illustrated, it shall be understood that the above-mentioned embodiments are exemplary and not construed as limitations to the present invention. Various changes, modifications, alternatives and variants within the scope of the present invention may be made by those skilled in the art.

What is claimed is:

1. A magnetic fluid sealing device, comprising:
   a housing;
   a shaft rotatably penetrating through the housing;
   a first shaft sleeve made of a magnetic conductive material, a volume of the first shaft sleeve being configured to increase with a rise of a temperature in the housing, and the first shaft sleeve being fitted over the shaft;
   a plurality of pole shoes arranged in the housing and fitted over the shaft and the first shaft sleeve, an inner circumferential surface of the pole shoes being provided with a plurality of pole teeth arranged at intervals in an axial direction of the shaft, the shaft and a first part of the plurality of pole teeth being arranged at intervals in a radial direction of the shaft to form a first gap, the first shaft sleeve and a second part of the plurality of pole teeth being arranged at intervals in the radial direction of the shaft to form a second gap, a magnetic fluid having a base fluid with a small molecular weight is arranged in the first gap, a magnetic fluid having a base fluid with a large molecular weight is arranged in the second gap, the second gap being configured to be reduced with an increase of the volume of the first shaft sleeve, the second gap being greater than the first gap when the temperature in the housing is not higher than a preset value, and the plurality of pole shoes being arranged at intervals in the axial direction of the shaft; and
   a permanent magnet arranged in the housing and fitted over the shaft, the permanent magnet being arranged between two adjacent pole shoes.

2. The magnetic fluid sealing device according to claim 1, wherein the pole shoes comprise a first section and a second section connected in sequence in the axial direction of the shaft, a cross-sectional area of an inner circumferential profile of the first section is less than a cross-sectional area of an inner circumferential profile of the second section, the first part of the plurality of pole teeth are arranged to an inner circumferential surface of the first section, and the second part of the plurality of pole teeth are arranged to an inner circumferential surface of the second section.

3. The magnetic fluid sealing device according to claim 2, wherein in adjacent pole shoes, the second section of one pole shoe is closer to an other pole shoe than the first section of the one pole shoe, and the second section of the other pole shoe is closer to the one pole shoe than the first section of the other pole shoe.

4. The magnetic fluid sealing device according to claim 2, wherein the first section and the second section are integrally formed.

5. The magnetic fluid sealing device according to claim 1, wherein a flange is arranged to the shaft, and the first gap between at least one pole shoe of the plurality of pole shoes and the shaft is defined between the flange and the first part of the plurality of pole teeth of the at least one pole shoe.

6. The magnetic fluid sealing device according to claim 5, further comprising a second shaft sleeve fitted over the shaft, the second shaft sleeve and the flange being arranged at intervals in the axial direction of the shaft, the first gap between at least another one pole shoe of the plurality of pole shoes and the shaft being defined between the second shaft sleeve and the first part of the plurality of pole teeth of the at least another one pole shoe, and
   the first shaft sleeve being arranged between the flange and the second shaft sleeve.

7. The magnetic fluid sealing device according to claim 6, wherein when the temperature in the housing is not higher than the preset value, in a projection plane orthogonal to the axial direction of the shaft, a projection of the first shaft sleeve is located in a projection of the flange, and the projection of the first shaft sleeve is located in a projection of the second shaft sleeve.

8. The magnetic fluid sealing device according to claim 6, further comprising an elastic member arranged between the first shaft sleeve and the flange and between the first shaft sleeve and the second shaft sleeve.

9. The magnetic fluid sealing device according to claim 1, further comprising:
   a first magnetic isolation ring and a second magnetic isolation ring arranged in the housing and fitted over the shaft, the first magnetic isolation ring and the second magnetic isolation ring being arranged at intervals in the axial direction of the shaft, and the plurality of pole shoes being located between the first magnetic isolation ring and the second magnetic isolation ring; and
   a first bearing and a second bearing arranged in the housing and mounted to the shaft, the first magnetic isolation ring and the second magnetic isolation ring being located between the first bearing and the second bearing.

10. The magnetic fluid sealing device according to claim 1, further comprising a sealing ring, an annular groove being defined in an outer circumferential surface of the pole shoes, the sealing ring being fitted in the annular groove, and an outer circumferential surface of the sealing ring being attached to an inner circumferential surface of the housing.

\* \* \* \* \*